(12) United States Patent
Schramm et al.

(10) Patent No.: US 9,054,629 B2
(45) Date of Patent: Jun. 9, 2015

(54) SENSORLESS TORSIONAL MODE DAMPING SYSTEM AND METHOD

(75) Inventors: Simon Herbert Schramm, Munich (DE); Johannes Huber, Brandenberg (AT); Christof Martin Sihler, Munich (DE); Sergio De Franciscis, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 224 days.

(21) Appl. No.: 13/638,746

(22) PCT Filed: Mar. 30, 2011

(86) PCT No.: PCT/EP2011/054964
§ 371 (c)(1),
(2), (4) Date: Dec. 12, 2012

(87) PCT Pub. No.: WO2011/121050
PCT Pub. Date: Oct. 6, 2011

(65) Prior Publication Data
US 2013/0162186 A1    Jun. 27, 2013

(30) Foreign Application Priority Data
Apr. 1, 2010    (IT) .............................. CO2010A0013

(51) Int. Cl.
*H02P 7/00* (2006.01)
*H02P 21/13* (2006.01)
(Continued)

(52) U.S. Cl.
CPC ................ *H02P 21/13* (2013.01); *H02P 21/05* (2013.01); *H02P 21/148* (2013.01)

(58) Field of Classification Search
CPC ......................................................... H02P 27/06
USPC .......... 318/702, 801, 400.22, 400.14, 400.15, 318/432; 322/19, 29, 40, 45, 59; 290/7, 44
See application file for complete search history.

(56) References Cited

U.S. PATENT DOCUMENTS 7,173,399 B2 *  2/2007  Sihler et al. .................... 322/40
7,423,411 B2 *  9/2008  Sihler ............................ 322/19
(Continued)

FOREIGN PATENT DOCUMENTS

CN    101567661 A    10/2009
DE    4427697 A1    2/1995
(Continued)

OTHER PUBLICATIONS

Italian Search Report for IT Application No. CO2010A000013, dated Nov. 22, 2010.
(Continued)

*Primary Examiner* — Antony M Paul
(74) *Attorney, Agent, or Firm* — GE Global Patent Operation (57) ABSTRACT

A torsional mode damping controller system is connected to a converter that drives an electrical machine mechanically connected to a train. The controller system includes an input interface configured to receive measured data related to variables of the converter or the electrical machine, and a controller connected to the input interface. The controller calculates at least one dynamic torque component along a section of a shaft of the train based on the data from the input interface, generates control data for the converter for damping a torsional oscillation in the mechanical drive train based on the at least one dynamic torque component, and sends the control data to the converter for modulating an active power exchanged between the converter and the electrical machine.

20 Claims, 11 Drawing Sheets

(51) Int. Cl.
*H02P 21/05* (2006.01)
*H02P 21/14* (2006.01)

(56) References Cited

U.S. PATENT DOCUMENTS

2006/0244425 A1* 11/2006 Sihler .............................. 322/58
2009/0009129 A1    1/2009 Markunas et al.

FOREIGN PATENT DOCUMENTS

| EP | 2073375 A1 | 6/2009 |
| EP | 2164165 A1 | 3/2010 |
| JP | 2000125410 A | 4/2000 |
| JP | 2009268267 A | 11/2009 |

OTHER PUBLICATIONS

T. Kakinoki et al., Observer-based Excitation control of Turbine-Generator Shaft Oscillation, IEEE, downloaded Oct. 15, 2009, pp. 1225-1230.

C. Sihler et al., Torsional Mode Damping for Electrically Driven Gas Compression Trains in Extended Variable Speed Operation, Proccedings on the Thirty-Eighth Turbomachinery Symposium, 2009, pp. 81-92.

Unofficial English Translation of Chinese Office Action and Search Report issued in connection with corresponding CN Application No. 201180027189.8 on Oct. 21, 2014.

Unofficial English translation of Japanese Office Action issued in connection with corresponding JP Application No. 2013-501840 on Dec. 24, 2014.

* cited by examiner

SENSORLESS TORSIONAL MODE DAMPING SYSTEM AND METHOD

CROSS REFERENCE TO RELATED APPLICATIONS

This is a national stage application under 35 U.S.C. §371 (c) of prior-filed, co-pending PCT patent application serial number PCT/EP2011/054964, filed on Mar. 30, 2011, which claims priority to Italian Patent Application Serial No. CO2010A000013, filed on Apr. 1, 2010, the entire contents of which are incorporated herein by reference.

BACKGROUND OF THE INVENTION

Embodiments of the subject matter disclosed herein generally relate to methods and systems and, more particularly, to mechanisms and techniques for dampening a torsional vibration that appears in a rotating system.

The oil and gas industry has a growing demand for driving various machines at variable speeds. Such machines may include compressors, electrical motors, expanders, gas turbines, pumps, etc. Variable frequency electrical drives increase energy efficiency and provide an increased flexibility for the machines. One way for driving, for example, a large gas compression train is the load commutated inverter (LCI). However, a problem introduced by power electronics driven systems is the generation of ripple components in the torque of the machine due to electrical harmonics. The ripple component of the torque may interact with the mechanical system at torsional natural frequencies of the drive train, which is undesirable.

Figure 1:
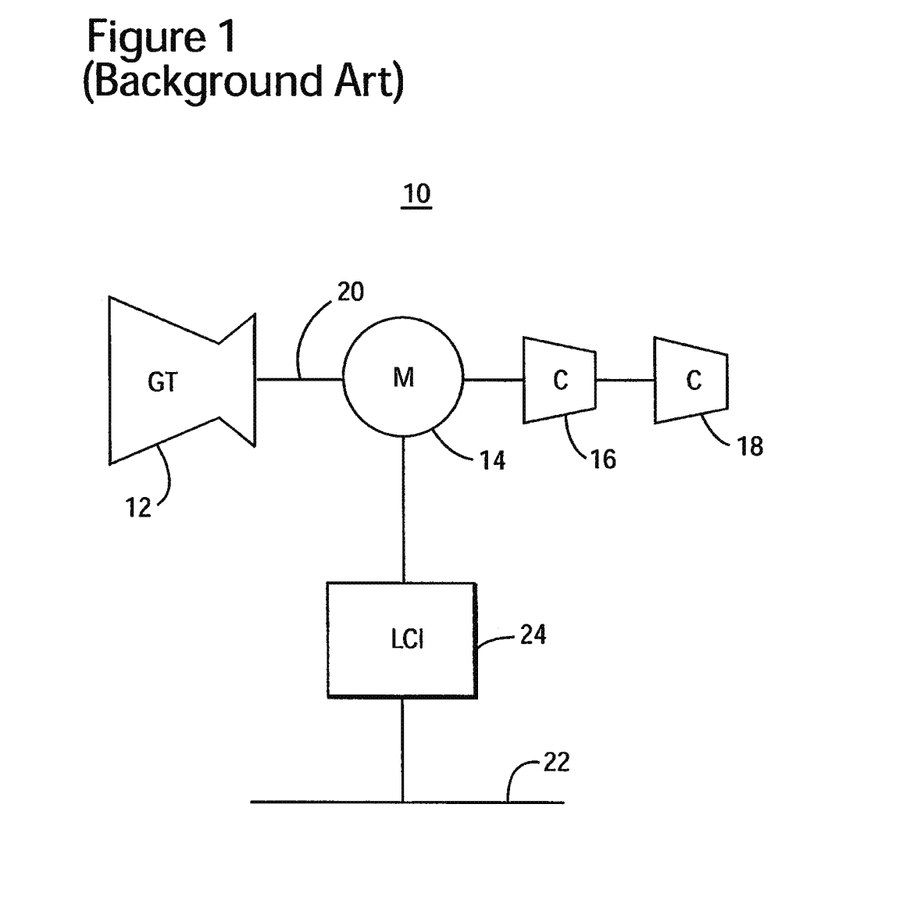
FIG. 1 is a schematic diagram of a conventional gas turbine connected to an electrical machine and two compressors.

A torsional oscillation or vibration is an oscillatory angular motion that may appear in a rotor having various masses attached to it as shown for example in FIG. 1. FIG. 1 shows a system 10 having a gas turbine 12, a motor 14, a first compressor 16 and a second compressor 18. The shafts of these machines are either connected to each other or a single shaft is shared by these machines. Because of the impellers and other masses distributed along shaft 20, a rotation of the shaft 20 may be affected by torsional oscillations produced by the rotation with different speeds of the masses (impellers for example) attached to the shaft.

Figure 2:
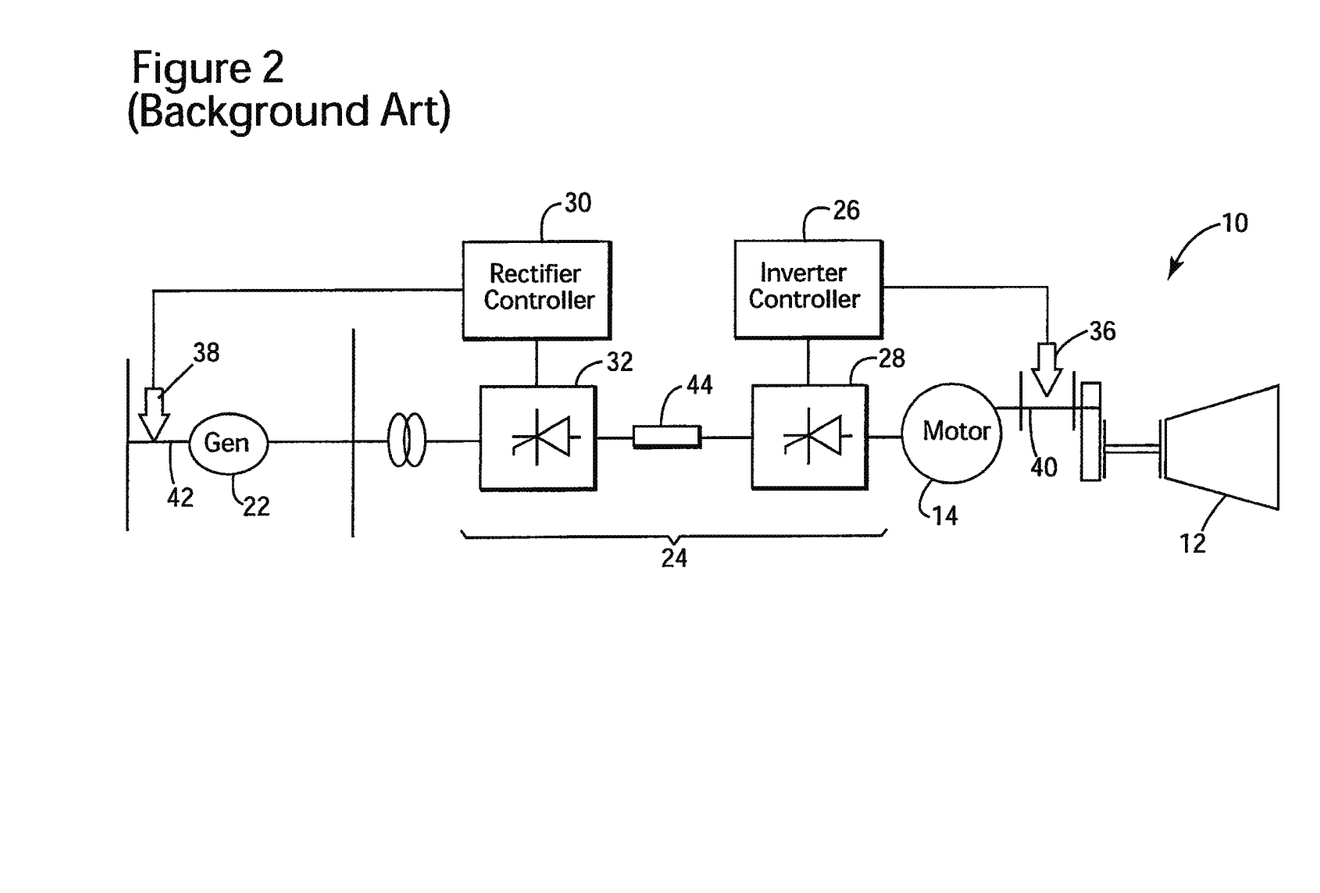
FIG. 2 is a schematic diagram of a variable speed drive system connected to an electrical motor and mechanical load, including rectifier controller and inverter controller.

As discussed above, the torsional vibrations are typically introduced by the power electronics that drive, for example, the motor. FIG. 1 shows a power grid source (power source) 22 providing electrical power to the LCI 24, which in turn drives the rotor 20 of the motor 14. The power grid may be an isolated power generator. In order to damp (minimize) the torsional vibrations, as shown in FIG. 2 (which corresponds to FIG. 1 of U.S. Pat. No. 7,173,399, assigned to the same assignee as this application, the entire disclosure of which is incorporated here by reference), an inverter controller 26 may be provided to an inverter 28 of the LCI 24 and may be configured to introduce an inverter delay angle change ($\Delta\beta$) for modulating an amount of active power transferred from inverter 28 to motor 14. It is noted that the term "delay angle" is considered in the literature as being synonymous with the term "firing angle." For this reason, these terms are considered in this description to mean the same thing and may be used interchangeably. This assumption is true irrespective if alpha or beta modulation is considered. Alternatively, a rectifier controller 30 may be provided to a rectifier 32 and may be configured to introduce a rectifier delay angle change ($\Delta\alpha$) for modulating the amount of active power transferred from the generator 22 to the DC-link and thus to the motor 14. It is noted that by modulating the amount of active power transferred from the generator to the motor it is possible to damp the torsional vibrations.

The two controllers 26 and 30 receive as input, signals from sensors 36 and 38, respectively, and these signals are indicative of the torque experienced by the motor 14 and/or the generator 22. In other words, the inverter controller 26 processes the torque value sensed by sensor 36 for generating the inverter delay angle change ($\Delta\alpha$) while the rectifier controller 30 processes the torque value sensed by the sensor 38 for generating the rectifier delay angle change ($\Delta\alpha$). The inverter controller 26 and the rectifier controller 30 are independent from each other and these controllers may be implemented together or alone in a given machine, dependent on the operation and the system sensitivity of the connected drive trains. FIG. 2 shows that sensor 36 monitors a part (section) 40 of the shaft of the motor 14 and sensor 38 monitors a shaft 42 of the power generator 22. FIG. 2 also shows a DC link 44 between the rectifier 32 and the inverter 28.

However, measuring mechanical properties, e.g., mechanical torque applied to a rotational shaft, can be expensive or impractical for high power drive trains. Sometimes, measuring the mechanical torque is not possible as the shaft is not accessible, or the shaft is surrounded by an explosive atmosphere, such as in gas compression applications. Accordingly, it would be desirable to provide systems and methods that avoid measuring the mechanical torque applied to the rotational shaft.

BRIEF SUMMARY OF THE INVENTION

According to one exemplary embodiment, there is a torsional mode damping controller connected to a converter that drives an electrical machine mechanically connected to a train. The controller system includes an input interface configured to receive measured data related to variables of the converter or the electrical machine; and a controller connected to the input interface. The controller is configured to calculate at least one dynamic torque component along a section of a shaft of the train based on the data from the input interface, generate control data for the converter for damping a torsional oscillation in the electrical machine based on the at least one dynamic torque component, and send the control data to the converter for modulating an active power exchanged between the converter and the electrical machine.

According to another exemplary embodiment, there is a system for driving an electrical machine mechanically connected to a train. The system includes a rectifier configured to receive an alternative current from a power source and to transform the alternative current into a direct current; a direct current link connected to the rectifier and configured to transmit the direct current; an inverter connected to the direct current link and configured to change a received direct current into an alternative current; an input interface configured to receive measured data related to electrical variables of the direct current link or the inverter; and a controller connected to the input interface. The controller is configured to calculate at least one dynamic torque component along a section of a shaft of the train based on the data from the input interface, generate control data for the rectifier and/or inverter for damping a torsional oscillation in the electrical machine based on the at least one dynamic torque component, and send the control data to the rectifier and/or inverter for modulating an active power exchanged between the inverter and the electrical machine.

According to an exemplary embodiment, there is a method for damping a torsional vibration in an electrical machine mechanically connected to a train. The method includes a step of receiving measured data related to electrical parameters of a converter that drives the motor; calculating at least a dynamic torque component along a section of a shaft of the train based on the received data; a step of generating control data for the converter for damping the torsional vibration based on the at least one dynamic torque component; and a step of sending the control data to the converter for modulating an active power exchanged between the converter and the electrical machine.

According to still another exemplary embodiment, there is a computer readable medium including computer executable instructions, where the instructions, when executed, implement the method for damping torsional vibrations discussed in the previous paragraph.

According to yet another exemplary embodiment, there is a torsional mode damping controller system connected to a converter that drives an electrical machine mechanically connected to a train. The controller system includes an input interface configured to receive measured data related to mechanical variables of a turbo-machinery of the train; and a controller connected to the input interface. The controller is configured to calculate at least one dynamic torque component along a section of a shaft of the train based on the mechanical variables of the turbo-machinery, generate control data for the converter for damping a torsional oscillation in the electrical machine based on the at least one dynamic torque component, and send the control data to the converter for modulating an active power exchanged between the converter and the electrical machine.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE EXEMPLARY EMBODIMENTS OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an electrical motor driven by a load commutated inverter. However, the embodiments to be discussed next are not limited to such a system, but may be applied (with appropriate adjustments) to other systems that are driven with other devices, as for example, a voltage source inverter (VSI).

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a torsional mode damping controller may be configured to obtain information from electrical measurements instead of a shaft of an electrical machine (which may be a motor or a generator) and to estimate, based on the information from the electrical measurements, torsional vibrations at a desired shaft location of a sensitive drive train. The torsional vibrations may be dynamic components in the torque, torsion angle, torsional speed or a torsional acceleration of the shaft. In other words, according to this exemplary embodiment, there are no sensors that directly monitor the dynamic torque components on dedicated shaft locations of the sensitive drive train. As will be discussed next, there are various locations at the converter from which the information received by the controller can be collected.

Figure 3:
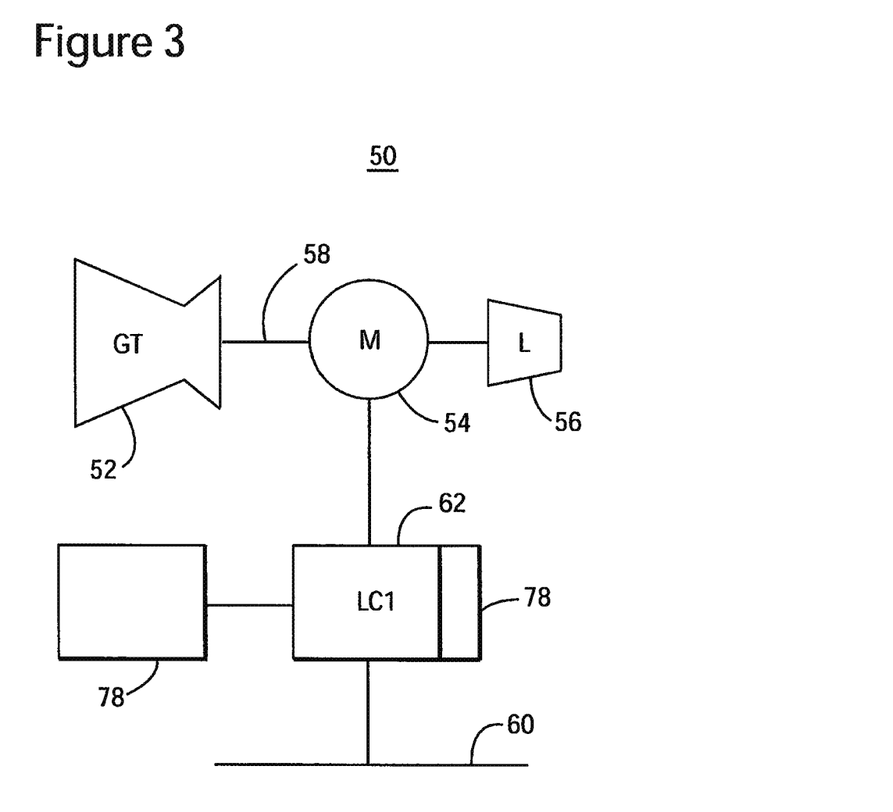
FIG. 3 is a schematic diagram of a gas turbine, motor and load controlled by a controller according to an exemplary embodiment.

According to an exemplary embodiment shown in FIG. 3, a system 50 includes a gas turbine 52, a motor 54, and a load 56. Other configurations involving plural gas turbines and plural compressors as load 56 are possible. Still other configurations may include one or more expanders, one or more power generators, or other machines having a rotating part, e.g., wind turbines, gearboxes. The system shown in FIG. 3 is exemplary and is simplified for a better understanding of the novel features. However, one skilled in the art would appreciate that other systems having more or less components may be adapted to include the novel features now discussed.

Load 56 may include one or more compressors or other machines used in the oil and gas industry. The connection of various masses (associated with the rotors and impellers of the machines) to a shaft 58 makes the system 50 prone to potential torsional vibrations. These torsional vibrations may twist the shaft 58, which may result in significant lifetime reduction or even destruction of the shaft system (which may include not only the shaft or shafts but also couplings and gearbox depending on the specific situation). The exemplary embodiments provide a mechanism for reducing the torsional vibrations.

Figure 4:
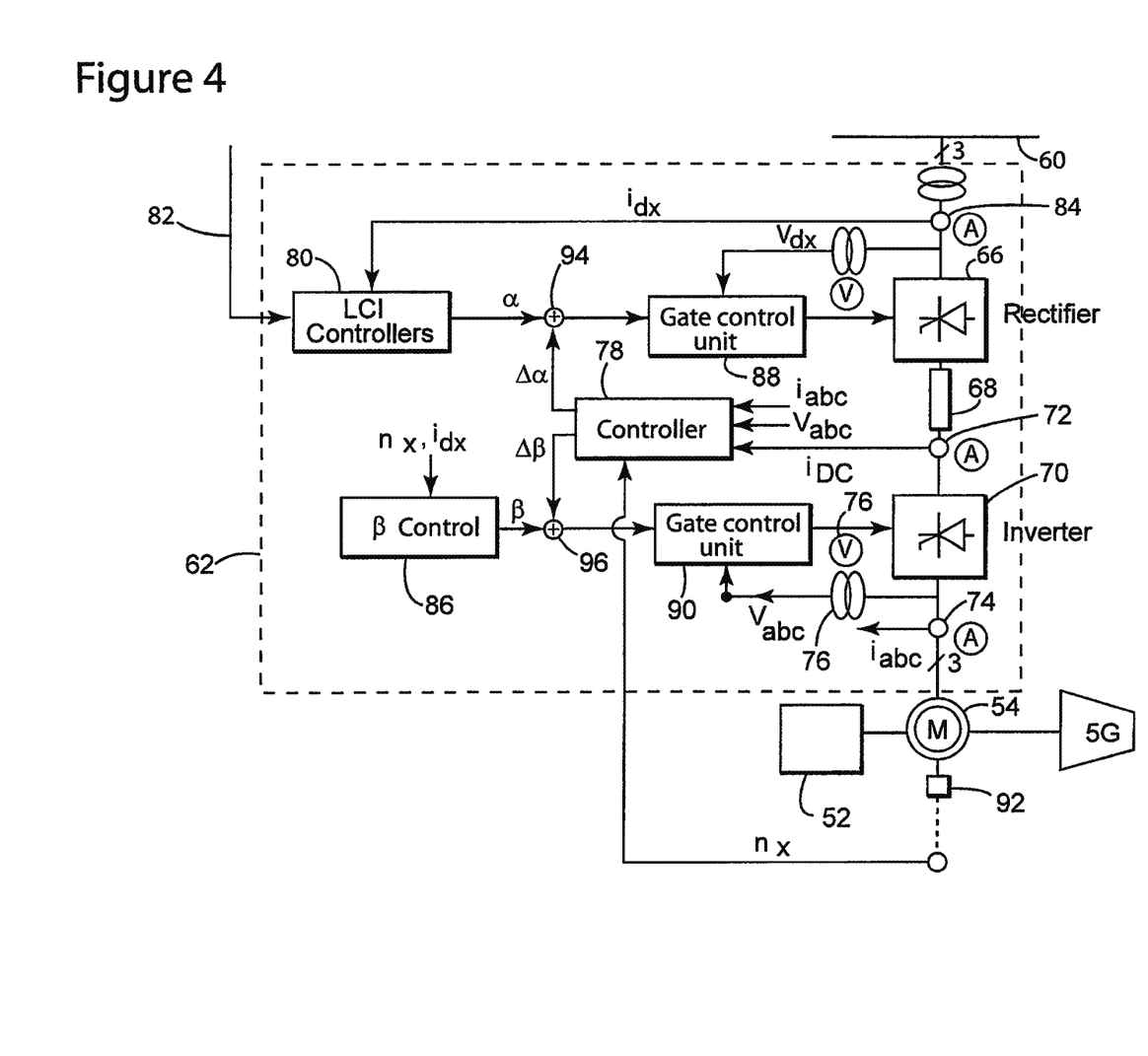
FIG. 4 is a schematic diagram of a converter and associated logic according to an exemplary embodiment.

To activate the motor 54, electrical power is supplied from the power grid or a local generator 60 in case of island or island like power systems. In order to drive the motor 54 at a variable speed, a load commutated inverter (LCI) 62 is provided between the grid 60 and the motor 54. As shown in FIG. 4, the LCI 62 includes a rectifier 66 connected to a DC link 68 which is connected to an inverter 70. The rectifier 66, DC link 68, and inverter 70 are known in the art and their specific structures are not discussed here further. As noted above, the novel features may be applied, with appropriate changes, to VSI systems. For illustration only, an exemplary VSI is shown and briefly discussed with regard to FIG. 11. FIG. 4 indicates that the current and voltage received from the grid 60 are three phase currents and voltages, respectively. The same is true for the currents and voltages through the rectifier, inverter and the motor and this fact is indicated in FIG. 4 by symbol "/3". However, the novel features of the exemplary embodiments are applicable to systems configured to work with more than three phases, e.g., 6 phase and 12 phase systems.

LCI 62 also includes current and voltage sensors, denoted by a circled A and a circled V in FIG. 4. For example, a current sensor 72 is provided in the DC link 68 to measure a current $i_{DC}$. Alternatively, the current in the DC link is estimated based on measurements performed in the AC side, for example current sensors 84 or 74 as these sensors are less expensive than DC sensors. Another example is a current sensor 74 that measures a current $i_{abc}$ provided by the inverter 70 to the motor 54 and a voltage sensor 76 that measures a voltage $v_{abc}$ provided by the inverter 70 to the motor 54. It is noted that these currents and voltages are provided as input to a controller 78. The term "controller" is used herein to encompass any appropriate digital, analog, or combination thereof circuitry or processing units for accomplishing the designated control function. Returning to FIG. 3, it is noted that controller 78 may be part of the LCI 62 or may be a stand alone controller exchanging signals with the LCI 62. The controller 78 may be a torsional mode damping controller.

FIG. 4 also shows that an LCI controller 80 generates, based on various references 82, and a current $i_{dx}$ received from a sensor 84, a rectifier delay angle α for controlling the rectifier 66. Another controller 86 may be used for generating an inverter delay angle β for the inverter 70. Further, FIG. 4 shows a gate control unit 88 for the rectifier 66 and a gate control unit 90 for the inverter 70 that directly control the rectifier and inverter based on information received from controllers 80 and 86.

An optional sensor 92 may be located in close proximity to the shaft of the motor 54 for detecting the dynamic torque components, e.g., a torque present in the shaft or a torsional position of the shaft or a torsional speed of the shaft or a torsional acceleration of the shaft. Information $n_x$ regarding the dynamic torque components may be provided to controllers 78, 80 and 86. FIG. 4 also shows summation blocks 94 and 96 that add a signal from controller 78 to signals generated by controllers 80 and 86.

Figure 5:
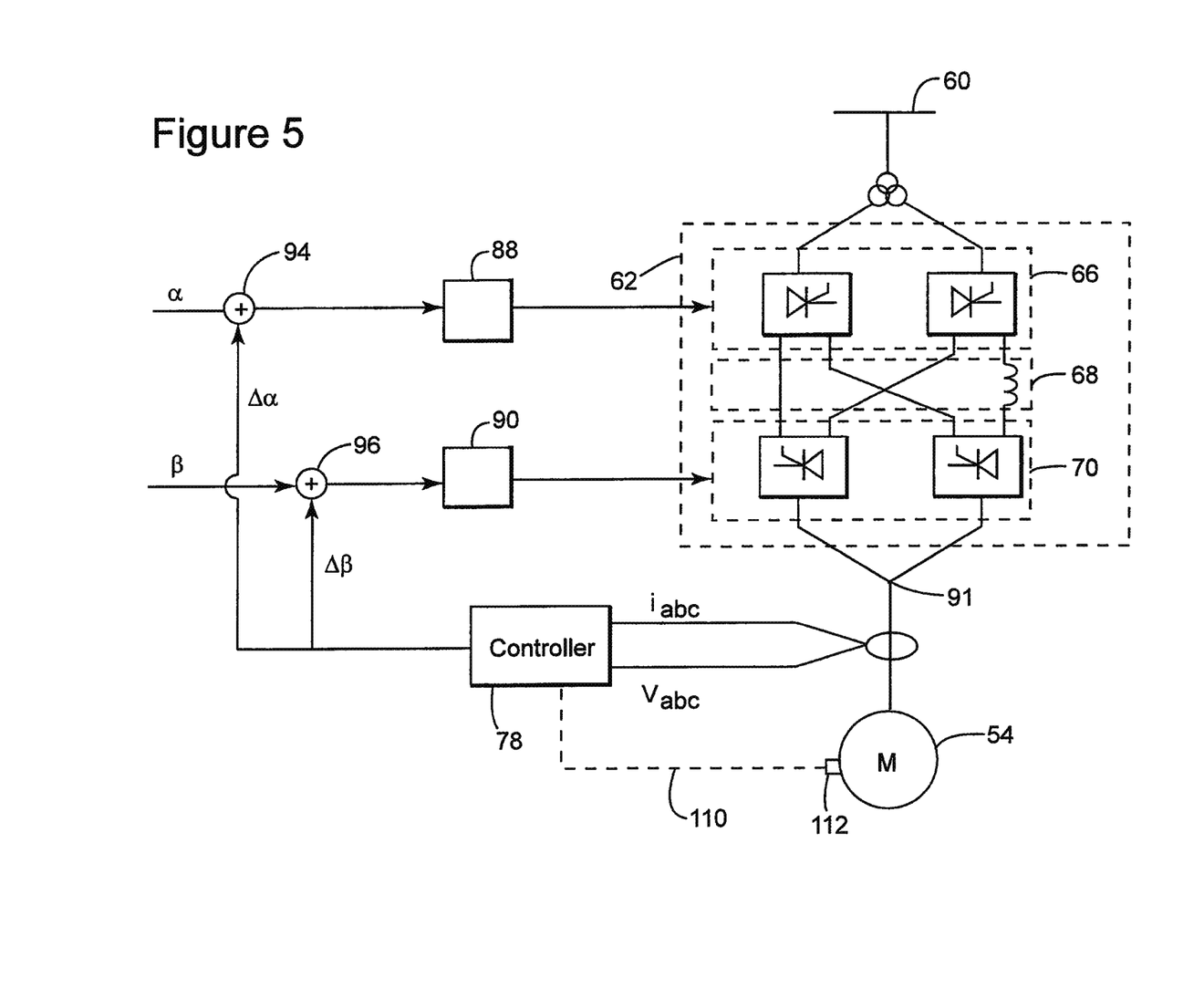
FIG. 5 is a schematic diagram of a converter and associated logic according to an exemplary embodiment.

According to an exemplary embodiment illustrated in FIG. 5, the torsional mode damping controller 78 may receive a current $i_{abc}$ and a voltage $v_{abc}$ measured at an output 91 of the LCI 62 or the inverter 70. Based on these values (no information about a measured torque or speed or acceleration of the shaft of the motor), an air gap torque for the motor is calculated and fed into a mechanical model of the system. The mechanical model of the system may be represented by several differential equations representing the dynamic behavior of the mechanical system and linking the electrical parameters to the mechanical parameters of the system. The model representation includes, for example, estimated inertia, damping and stiffness values (which can be verified by field measurements) and allows to calculate the dynamic behavior of the shaft, e.g., torsional oscillations. The needed accuracy for torsional mode damping may be achieved as mainly the accuracy of the phase of the dynamic torque component is relevant for the torsional mode damping, and the amplitude information or absolute torque value is less important.

In this regard, it is noted that the air gap torque of an electrical machine is the link between the electrical and mechanical system of a drive train. All harmonics and inter-harmonics in the electrical system are also visible in the air-gap torque. Inter-harmonics at a natural frequency of the mechanical system can excite torsional oscillations and potentially result into dynamic torque values in the mechanical system above the rating of the shaft. Existing torsional mode damping systems may counteract such torsional oscillations but these systems need a signal representative of the dynamic torque of the mechanical shaft and this signal is obtained from a sensor that effectively monitors e.g., the shaft of the motor or shaft components of the motor, such as tooth-wheels mounted along the shaft of the motor. According to exemplary embodiments, no such signal is needed as the dynamic torque components are evaluated based on electrical measurements. However, as will be discussed later, some exemplary embodiments describe a situation in which available mechanical measurements at other components of the system, for example, the gas turbine, may be used to determine the dynamic torque components of the shaft of the motor.

In other words, an advantage according to an exemplary embodiment is applying torsional mode damping without the need of torsional vibration sensing in the mechanical system. Thus, torsional mode damping can be applied without having to install additional sensing in the electrical or mechanical system as current voltage and/or current and/or speed sensors can be made available at comparably low cost. In this regard, it is noted that mechanical sensors for measuring torque are expensive for high power applications, and sometimes these sensors cannot be added to the existing systems. Thus, the existent torsional mode damping solutions cannot be implemented for such cases as the existent torsional mode damping systems require a sensor for measuring a signal representative of a mechanical parameter of the system that is indicative of torque. On the contrary, the approach of the exemplary embodiment of FIG. 5 is reliable, cost effective and allows retrofitting an existing system.

Figure 6:
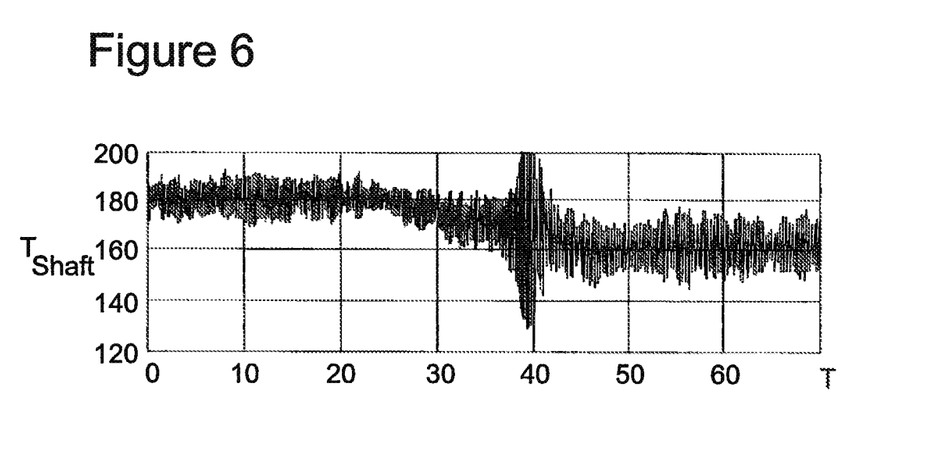
FIG. 6 is a graph illustrating a torque of a shaft with disabled damping control.
Figure 7:
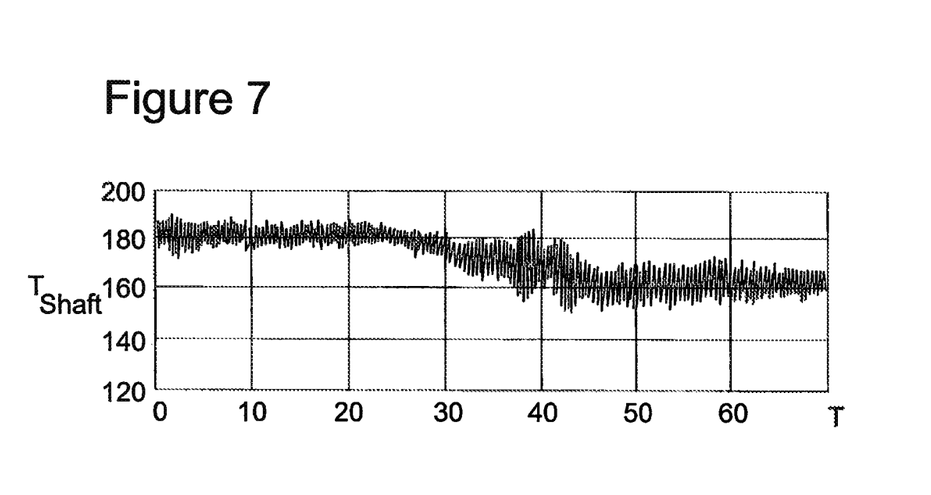
FIG. 7 is a graph illustrating a torque of a shaft with enabled damping control according to an exemplary embodiment.

Upon receiving the current and voltage indicated in FIG. 5, controller 78 may generate appropriate signals (one or more of Δα and Δβ) for controlling the rectifier delay angle α and/or the inverter delay angle β. Thus, according to the embodiment shown in FIG. 5, the controller 78 receives the input electrical information for calculating the various delay angles, based, for example, on the damping principle described in U.S. Pat. No. 7,173,399, from an output 91 of the inverter 70. As illustrated in FIG. 5, this exemplary embodiment is an open loop as corrections of the various angles are not adjusted/verified based on a measured signal (feedback) of the mechanical drive train connected to motor 54. Further, simulations performed show a reduction of the torsional vibrations when the controller 78 is enabled. FIG. 6 shows oscillations 100 of the torque of the shaft of the motor 54 versus time when the controller 78 is disabled and FIG. 7 shows how the same oscillations are reduced when the controller 78 is enabled, for example, at time 40s, while the mechanical drive train is operated in variable speed operation and crossing at t=40s a critical speed. Both figures plot a simulated torque on the y axis versus time on the x axis.

Figure 8:
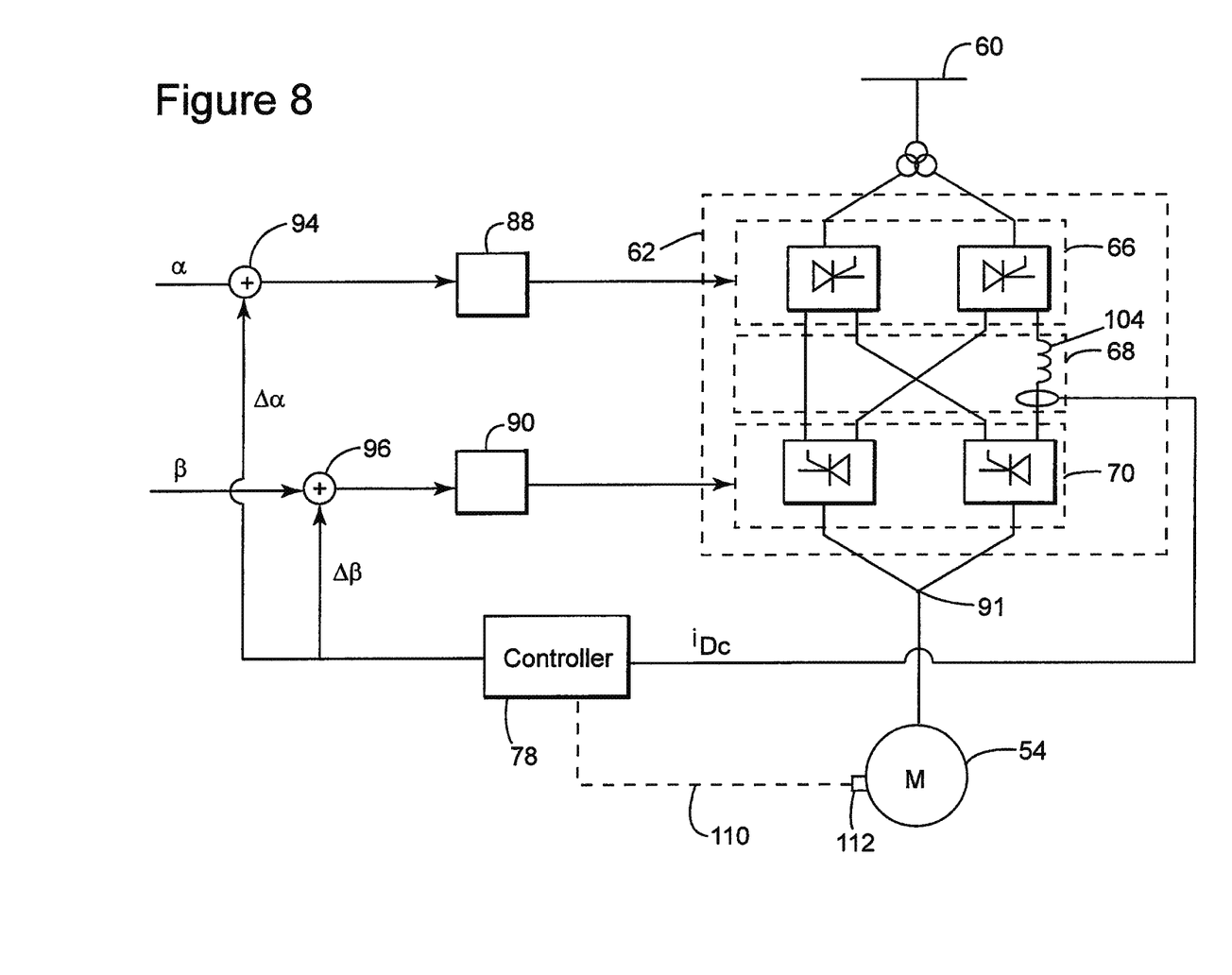
FIG. 8 is a schematic diagram of a converter and associated logic according to an exemplary embodiment.

According to another exemplary embodiment illustrated in FIG. 8, the controller 78 may be configured to calculate one or more of the delay angles changes Δα and/or Δβ based on electrical quantities obtained from the DC link 68. It is noted that although FIG. 8 shows a single DC link 68, there are configurations that use multiple DC links between the rectifiers and the inverters and one or more of these DC links may be measured and these measurements may be provided to the controller 78. More specifically, a current $i_{DC}$ may be measured at an inductor 104 of the DC link 68 and this value may be provided to controller 78. In one application, only a single current measurement is used for feeding controller 78. Based on the value of the measured current and the mechanical model of the system, the controller 78 may generate the above noted delay angle changes. According to another exemplary embodiment, the direct current $i_{DC}$ may be estimated based on current and/or voltage measurements performed at the rectifier 66 or inverter 70.

The delay angle changes calculated by the controller 78 in any of the embodiments discussed with regard to FIGS. 5 and 8 may be modified based on a closed loop configuration. The closed loop configuration is illustrated by dashed line 110 in FIG. 8 that indicates that an angular speed of the shaft of the motor 54 may be determined with an appropriate sensor 112 and this value may be provided to the controller 78. Based on this information, an accuracy of the model may be improved with feedback from the mechanical system, e.g., by utilizing existing high resolution speed measurements (classical observer). The quality of the speed measurement may even be improved with an adaptive filter algorithm. In one application, sensor 112 may measure another parameter of the shaft of motor 54, e.g., a rotational angle deviation at the motor coupling.

It is noted that the above discussed embodiments may be modified such that mechanical data instead of electrical data is measured and provided to the controller 78. Alternatively, both mechanical and electrical data may be measured. For these situations, the mechanical data may be measured along a shaft of the train to which the electrical motor is connected to. The mechanical data may be measured at the electrical motor or may be measured away from the electrical motor, for example, at the gas turbine.

Figure 9:
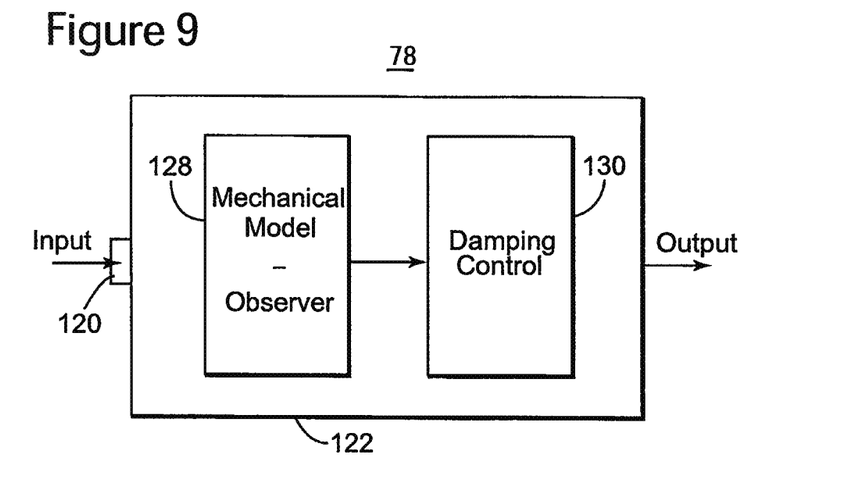
FIG. 9 is a schematic diagram of a controller configured to control a converter for damping torsional vibrations according to an exemplary embodiment.

The structure of the controller 78 is discussed now with regard to FIG. 9. According to an exemplary embodiment, the controller 78 may include an input interface 120 that is connected to one of a processor, analog circuitry, reconfigurable FPGA card, etc. 122. Element 122 is configured to receive the electrical parameters from the LCI 62 and calculate the delay angle changes. Element 122 may be configured to store a mechanical model 128 and to input the electrical measurements received at input interface 120 into the mechanical model 128 to calculate one or more of the dynamical torque components. Based on the one or more dynamical torque components, damping control signals are generated in damping control unit 130 and the output signal is then forwarded to a summation block and the gate control unit. According to another exemplary embodiment, the controller 78 may be an analog circuit, a reconfigurable FPGA card or other dedicated circuitry for determining the delay angle changes.

In one exemplary embodiment, controller 78 continuously receives electrical measurements from various current and voltage sensors and continuously calculates torsional damping signals based on dynamic torque components calculated based on the electrical measurements. According to this exemplary embodiment, the controller does not determine whether torsional vibrations are present in the shaft but rather continuously calculates the torsional damping signals based on the calculated dynamic torque value. However, if there are no torsional vibrations, the torsional damping signals generated by the controller and sent to the inverter and/or rectifier are not affecting the inverter and/or rectifier, i.e., the angle changes provided by the damping signals are negligible. Thus, according to this exemplary embodiment, the signals affect the inverter and/or rectifier only when there are torsional vibrations.

Figure 10:
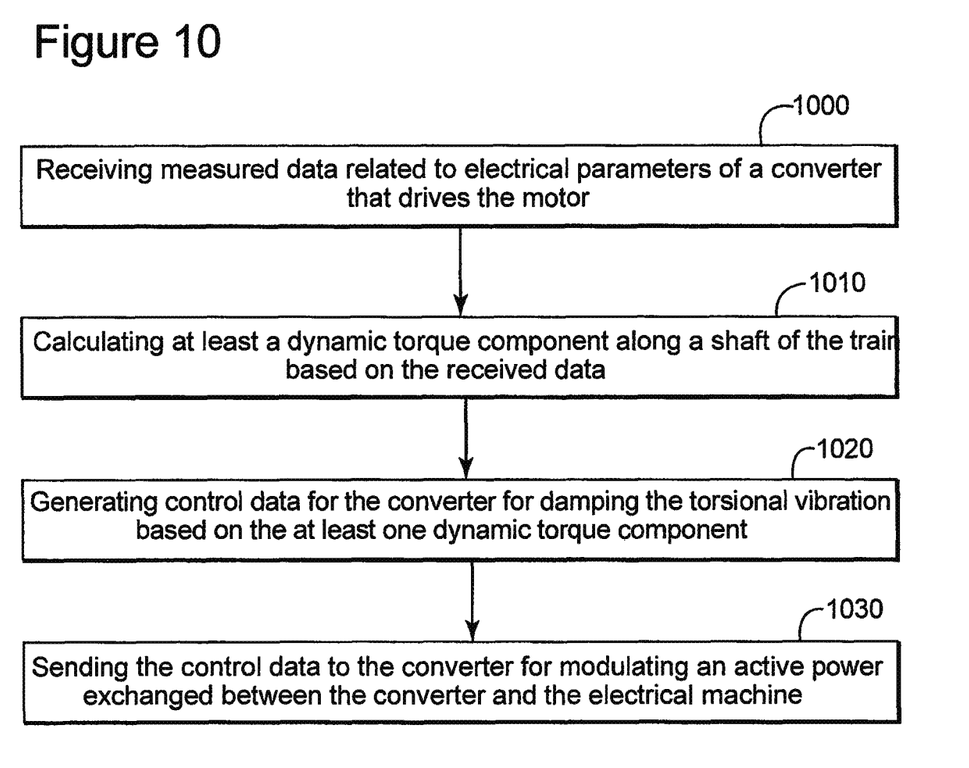
FIG. 10 is a flow chart illustrating a method for damping torsional vibrations according to an exemplary embodiment.

According to an exemplary embodiment illustrated in FIG. 10, there is a method for damping a torsional vibration in a machine connected to a motor. The method includes a step 1000 of receiving measured data related to electrical parameters of a converter that drives the motor, a step 1010 of calculating at least a dynamic torque component along a shaft of the train based on the received data, a step 1020 of generating control data for the converter for damping the torsional vibration based on the at least one dynamic torque component, and a step 1030 of sending the control data to the converter for modulating an active power exchanged between the converter and the electrical machine. It is noted that the expression modulating an active power is applicable even when a mean power over a time period is zero, i.e., there is at least an instant during the time period when the active power is modulated.

Figure 11:
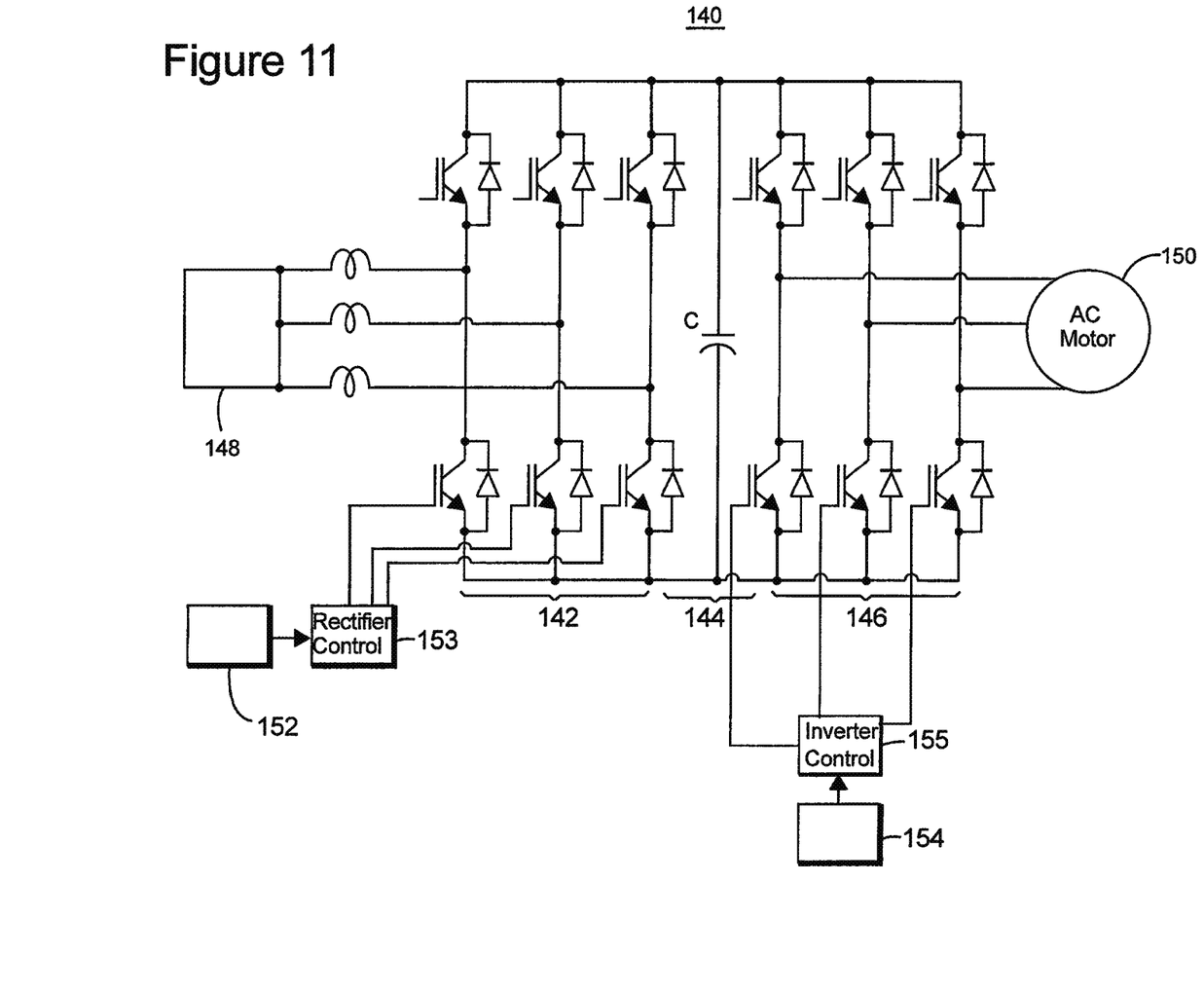
FIG. 11 is a schematic diagram of a voltage source inverter and associated controller for damping torsional vibrations according to an exemplary embodiment.

According to an exemplary embodiment illustrated in FIG. 11, a VSI 140 includes a rectifier 142, a DC link 144, and an inverter 146 connected to each other in this order. The rectifier 142 receives a grid voltage from a power source 148 and may include, for example, a diode bridge or an active front-end based on self-commutated semiconductor devices. The dc voltage provided by the rectifier 142 is filtered and smoothed by capacitor C in the DC link 144. The filtered dc voltage is then applied to the inverter 146, which may include self-commutated semiconductor devices, e.g., Insulated Gate Bipolar Transistors (IGBT), that generate an ac voltage to be applied to motor 150. Controllers 152 and 154 may be provided for rectifier 142 and inverter 146, in addition to the rectifier and inverter controllers or integrated with the rectifier and inverter controllers, to damp torsional vibrations on the shaft of the motor 150. The rectifier controller 153 and inverter controller 155 are shown connected to some of the semiconductor devices but it should be understood that all the semiconductor devices may be connected to the controllers. Controllers 152 and 154 may be provided together or alone and they are configured to determine dynamic torque components based on electrical measurements as discussed with regard to FIGS. 4 and 5 and influence control references of the build-in rectifier and inverter control, e.g., the torque or current-control reference.

Figure 12:
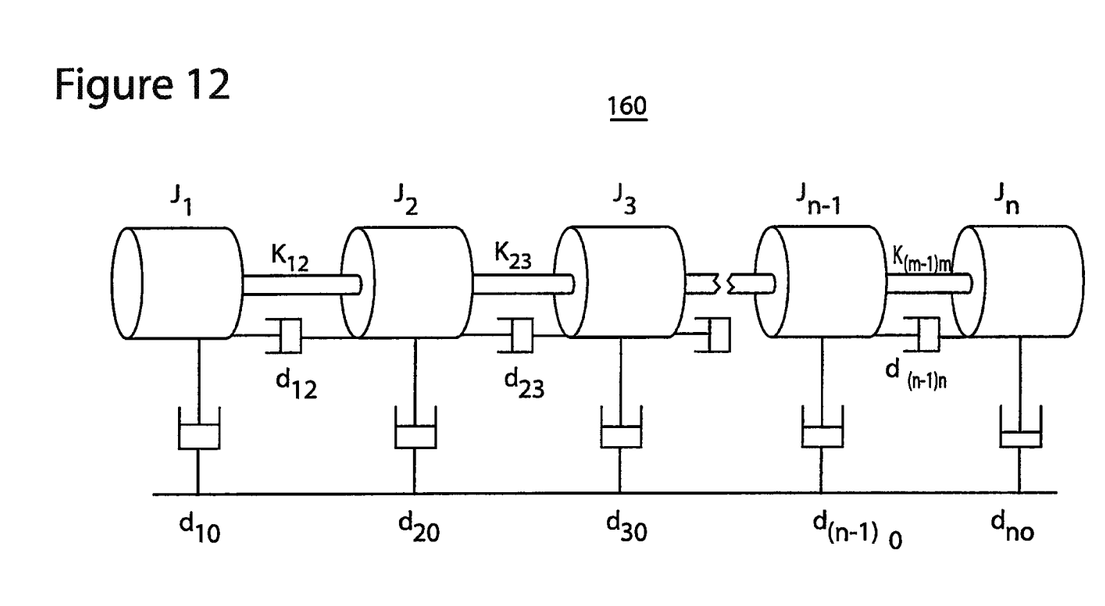
FIG. 12 is a schematic diagram of a multimass system.

According to an exemplary embodiment illustrated in FIG. 12, a generalized multimass system 160 may include "n" different masses having corresponding moments of inertia $J_1$ to $J_n$. For example, the first mass may correspond to a gas turbine, the second mass may correspond to a compressor, and so on while the last mass may correspond to an electrical motor. Suppose that the shaft of the electrical motor is not accessible for mechanical measurements, e.g., rotational position, speed, acceleration or torque. Further, suppose that the shaft of the gas turbine is accessible and one of the above noted mechanical parameters may be directly measured at the gas turbine. In this regard, it is noted that generally a gas turbine has high accuracy sensors that measure various mechanical variables of the shaft for protecting the gas turbine from possible damages. On the contrary, a conventional motor does not have these sensors or even if some sensors are present, the accuracy of their measurements is poor.

The differential equation of the whole mechanical system is given by:

$$J(d\theta^2/dt^2)+D(d\theta/dt)+K\theta=T_{ext},$$

where J (torsional matrix), D (damping matrix), and K (torsional stiffness matrix) are matrices connecting the characteristics of the first mass (for example, $d_{10}$, $d_{12}$, $k_{12}$, $J_1$) to the characteristics of the other masses and $T_{ext}$ is an external (net) torque applied to the system, e.g., by a motor. Based on this model of the mechanical system, a torque or other dynamic torque component of the "n" mass may be determined if characteristics of, for example, the first mass are known. In other words, the high accuracy sensors provided in the gas turbine may be used to measure at least one of a torsional position, speed, acceleration or torque of the shaft of the gas turbine. Based on this measured value, a dynamic torque component of the motor ("n" mass) or another section of the drive train may be calculated by a processor or controller 78 of the system and thus, control data may be generated for the inverter or rectifier as already discussed above.

In other words, according to this exemplary embodiment, the controller 78 needs to receive mechanical related information from one turbo-machinery that is connected to the motor and based on this mechanical related information the controller is able to control the converter to generate a torque in the motor to damp the torsional vibration. The turbo-machinery may be not only a gas turbine but also a compressor, an expander or other known machines. In one application, no electrical measurements are necessary for performing the damping. However, the electrical measurements may be combined with mechanical measurements for achieving the damping. In one application, the machine that applies the damping (damping machine) is not accessible for mechanical measurements and the dynamic torque component of the damping machine is calculated by mechanical measurements performed on another machine that is mechanically connected to the damping machine.

The disclosed exemplary embodiments provide a system and a method for damping torsional vibrations. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A torsional mode damping controller system connected to a converter that drives an electrical machine mechanically connected to a train, the controller system comprising:
   an input interface configured to receive measured data related to variables of the converter or the electrical machine; and
   a controller connected to the input interface and configured to:
      calculate at least one dynamic torque component along a section of a shaft of the train based on the data from the input interface using a mechanical model comprising at least one of an inertia value, a damping value, and a stiffness value;
      generate control data for the converter for damping a torsional oscillation in the mechanical drive train based on the at least one dynamic torque component; and
      send the control data to the converter for modulating an active power exchanged between the converter and the electrical machine.

2. The controller system of claim 1, wherein the generated control data is configured to modify a rectifier delay angle of a rectifier that is part of the converter.

3. The controller system of claim 1, wherein the generated control data is configured to modify an inverter delay angle of an inverter that is part of the converter.

4. The controller system of claim 1, wherein the received data is indicative of a current and a voltage provided by the converter to the electrical machine.

5. The controller system of claim 1, wherein the received data is indicative of a direct current (DC) link current between a rectifier and an inverter of the converter.

6. The controller system of claim 1, wherein the received data is indicative of an angular position, speed, acceleration or torque of the electrical machine and the generated control data is configured to modify an inverter delay angle of an inverter or a rectifier delay angle of a rectifier that is part of the converter.

7. The controller system of claim 1, wherein the controller is further configured to:
   receive feedback data indicative of an angular position, speed, acceleration or torque of the electrical machine; and
   determine the control data for the converter for damping the torsional oscillation based on the received data indicative of electrical variables of the converter and the feeback data indicative of the angular position, speed, acceleration or torque of the mechanical drive train.

8. A system for driving an electrical machine mechanically connected to a train, the system comprising:
   a rectifier configured to receive an alternative current from a power source and to transform the alternative current into a direct current;
   a direct current link connected to the rectifier and configured to transmit the direct current;
   an inverter connected to the direct current link and configured to change a received direct current into an alternative current;
   an input interface configured to receive measured data related to electrical variables of the direct current link or the inverter; and
   a controller connected to the input interface and configured to:
      calculate at least one dynamic torque component along a section of a shaft of the drive train based on the data from the input interface using a mechanical model comprising at least one of an inertia value, a damping value, and a stiffness value;
      generate control data for the rectifier and/or inverter for damping a torsional oscillation in the mechanical drive train based on the at least one dynamic torque component; and send the control data to the rectifier and/or inverter for modulating an active power exchanged between the inverter and the electrical machine.

9. The system of claim 8, wherein the generated control data is configured to modify a rectifier delay angle of a rectifier that is part of the converter.

10. The system of claim 8, wherein the generated control data is configured to modify an inverter delay angle of an inverter that is part of the converter.

11. The system of claim 8, wherein the received data is indicative of a current and a voltage provided by the converter to the electrical machine.

12. A method for damping a torsional vibration in an electrical machine mechanically connected to a drive train, the method comprising:
    receiving measured data related to electrical variables of a converter that drives the motor;
    calculating at least a dynamic torque component along a section of a shaft of the train based on the received data;
    generating control data for the converter for damping the torsional vibration based on the at least one dynamic torque component using a mechanical model which comprises at least one of an inertia value, a damping value, and a stiffness value; and
    sending the control data to the converter for modulating an active power exchanged between the converter and the electrical machine.

13. The method of claim 12, wherein the generated control data is configured to modify a rectifier delay angle of a rectifier that is part of the converter.

14. The method of claim 12, wherein the generated control data is configured to modify an inverter delay angle of an inverter that is part of the converter.

15. The method of claim 12, wherein the received data is indicative of a current and a voltage provided by the converter to the electrical machine.

16. A torsional mode damping controller system connected to a converter that drives an electrical machine mechanically connected to a train, the controller system comprising:
    an input interface configured to receive measured data related to mechanical variables of a turbo-machinery of the train; and
    a controller connected to the input interface and configured to:
        calculate at least one dynamic torque component along a section of a shaft of the train based on the mechanical variables of the turbo-machinery using a mechanical model which comprises at least one of an inertia value, a damping value, and a stiffness value;
        generate control data for the converter for damping a torsional oscillation in the mechanical drive train based on the at least one dynamic torque component; and
        send the control data to the converter for modulating an active power exchanged between the converter and the electrical machine.

17. The damping controller system of claim 16, wherein the generated control data is configured to modify a rectifier delay angle of a rectifier that is part of the converter.

18. The damping controller system of claim 16, wherein the generated control data is configured to modify an inverter delay angle of an inverter that is part of the converter.

19. The damping controller system of claim 16, wherein the received data is indicative of a current and a voltage provided by the converter to the electrical machine.

20. The damping controller system of claim 16, wherein the received data is indicative of a direct current (DC) link current between a rectifier and an inverter of the converter.

* * * * *